US008300516B2

(12) United States Patent
Lee et al.

(10) Patent No.: US 8,300,516 B2
(45) Date of Patent: Oct. 30, 2012

(54) INFORMATION RECORDING MEDIUM WITH PREPIT AND RECORDING/REPRODUCING APPARATUS AND METHOD USING THE SAME

(75) Inventors: Kyung-geun Lee, Seongnam-si (KR); Shuichi Tasaka, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 787 days.

(21) Appl. No.: 11/545,527

(22) Filed: Oct. 11, 2006

(65) Prior Publication Data

US 2007/0091732 A1    Apr. 26, 2007

(30) Foreign Application Priority Data

Oct. 25, 2005   (KR) .................. 10-2005-0100915

(51) Int. Cl.
  *G11B 7/24* (2006.01)
  *G11B 5/58* (2006.01)
  *G11B 15/04* (2006.01)
  *G11B 19/04* (2006.01)
  *G11B 20/12* (2006.01)
  *G11B 7/20* (2011.01)

(52) U.S. Cl. ............... 369/275.3; 369/53.24; 369/59.25; 369/94

(58) Field of Classification Search ............... 369/30.1, 369/47.14, 47.22, 53.17
See application file for complete search history.

(56) References Cited

U.S. PATENT DOCUMENTS

| | | | |
|---|---|---|---|
| 5,500,850 A | 3/1996 | Van et al. | |
| 5,501,926 A * | 3/1996 | Cheng et al. | ...................... 430/5 |
| 6,906,994 B2 | 6/2005 | Lee et al. | |
| 2002/0021657 A1 * | 2/2002 | Lee et al. | .................. 369/275.4 |
| 2003/0137909 A1 | 7/2003 | Ito et al. | |
| 2004/0141454 A1 | 7/2004 | Kato et al. | |
| 2004/0165495 A1 * | 8/2004 | Park et al. | .................. 369/47.14 |
| 2005/0190685 A1 * | 9/2005 | Lee et al. | .................. 369/275.3 |
| 2006/0077879 A1 * | 4/2006 | Suh | ............................ 369/275.1 |
| 2007/0201343 A1 * | 8/2007 | Kuroda et al. | ............. 369/275.3 |
| 2008/0310290 A1 * | 12/2008 | Kuroda et al. | ............. 369/275.3 |

FOREIGN PATENT DOCUMENTS

| | | |
|---|---|---|
| AU | 2006306904 B2 | 9/2010 |
| CN | 1327229 | 12/2001 |
| EP | 1 160 775 A2 | 12/2001 |
| EP | 1 505 580 A2 | 2/2005 |
| EP | 1 669 985 A1 | 6/2006 |
| EP | 1 732 070 A1 | 12/2006 |

(Continued)

OTHER PUBLICATIONS

Japanese Office Action issued on Jan. 4, 2011, in corresponding Japanese Patent Application No. 2008-537591 (2 pages).

(Continued)

*Primary Examiner* — Joseph Haley
*Assistant Examiner* — Nicholas Lee
(74) *Attorney, Agent, or Firm* — NSIP Law

(57) ABSTRACT

An information recording medium that can be rapidly finalized, and a recording/reproducing apparatus and method using the same are provided. In the information recording medium, a prepit is pre-formed in a finalization area. Since the portion that has to be filled with data in finalizing the information recording medium is previously formed as the prepits series in manufacturing the information recording medium, the time necessary to finalize the information recording medium can be shortened, thereby achieving the rapid finalization of the medium.

9 Claims, 5 Drawing Sheets

FOREIGN PATENT DOCUMENTS

| | | |
|---|---|---|
| JP | 2001-344826 | 12/2001 |
| KR | 2001-108961 | 12/2001 |
| US | 200534263 | 10/2005 |
| WO | WO 2005/064599 A1 | 7/2005 |
| WO | WO 2005/093727 A1 | 10/2005 |
| WO | WO 2005093727 A1 * | 10/2005 |
| WO | WO 2006013823 A1 * | 2/2006 |

OTHER PUBLICATIONS

Taiwanese Office Action issued on Dec. 29, 2010, in corresponding Taiwanese Patent Application No. 095138188 (6 pages).

European Search Report issued on Jun. 30, 2010, in corresponding European Patent Application No. 10157928.2 (7 pages).

"Standard ECMA-337—$2^{nd}$ Edition—Data Interchange on 120mm and 80 Optical Disk Using +RW Format—Capacity 4,7 and 1,46 Gbytes per side" *ECMA International*, Dec. 31, 2003, pp. 1-121, XP002586007, Geneva, CH.

"Standard ECMA-364—1st Edition—Data Interchange on 120mm and 80 Optical Disk Using +R DL Format—Capacity 8,55 and 2,66 GBytes per side" *ECMA International*, Jun. 30, 2005, pp. 1-147, XP002586008, Geneva, CH.

Canadian Office Action issued on Jun. 29, 2011, in counterpart Canadian Patent Application No. 2623162 (3 pages, in English).

Chinese Second Office Action issued Oct. 20, 2011, in counterpart Chinese Application No. 200680038654.7 (15pp, including English translation).

Office Action issued on Jan. 4, 2012, in corresponding Japanese Patent Application No. 2008-537591, and English translation thereof.

Chinese Office Action issued on Mar. 1, 2010, in corresponding Chinese Application No. 200680038654.7 (7 pages).

Malaysian Substantive Examination Report issued Mar. 30, 2012 in counterpart Malaysian Patent Application No. PI2010000454 (3 pages, in English).

Korean Non-Final Office Action issued Apr. 17, 2012 in counterpart Korean Patent Application No. 10-2005-0100915 (8 pages, with English language translation).

Chinese Office Action issued Jun. 19, 2012 in counterpart Chinese Patent Application No. 200680038654.7 (19 pages, with English language translation).

Chinese Decision on Rejection issued Jun. 1, 2012 in counterpart Chinese Patent Application No. 201010238248.3 (14 pages, with English language translation).

\* cited by examiner

λ/3

λ/4

λ/6

λ/12

FINALIZATION AREA FORMED WITH PREPITS (35)

INFORMATION RECORDING MEDIUM WITH PREPIT AND RECORDING/REPRODUCING APPARATUS AND METHOD USING THE SAME

CROSS-REFERENCE TO RELATED PATENT APPLICATION

This application claims all benefits accruing under 35 U.S.C. §119 from Korean Patent Application No. 10-2005-0100915, filed on Oct. 25, 2005, in the Korean Intellectual Property Office, the disclosure of which is incorporated by reference herein.

BACKGROUND OF THE INVENTION

1. Field of the Invention

The present invention relates to an optical information recording medium, and more particularly, to an information recording medium that can be rapidly finalized, and a recording/reproducing apparatus and method using the same.

2. Related Art

Optical recording media (optical disks) are used in optical devices that record/reproduce data in a contact-less manner. Optical disks generally include compact disks (CD's) digital versatile disks (DVD's), high-definition video disks (HD-DVD's), blue-ray video disks (Blu-Ray) and other media used to digitally store data in a contact-less manner according to the information recording capacity. Some optical disks are writable or re-writable by a user to store data, video or audio. Examples of record/erase/read optical disks include a 650 MB CD-R, a CD-RW, a 4.7 GB DVD+R/RW, a DVD-RAM, and a DVD-R/RW. Examples of read-only disks include a 650 MB CD, a 4.7 GB DVD-ROM, HD-DVD and a Blu-Ray disk. Moreover, other technologies are under development to record data at higher densities and faster speeds using developmental optical media.

DVD-RAM and DVD-RW media generally have a recording data capacity of 4.7 GB, and are capable of having data recorded on, erased or reproduced there from. Specifically, each optical disk has grooves to guide an optical pick-up along tracks in a circumferential direction during a data recording operation. The grooves are formed during mastering of the disk, that is, when a stamper for a substrate is manufactured.

However, the greatest difference between a DVD-RAM and a DVD-RW is the recording area. In the DVD-RAM, data is recorded in both a groove area and a land area disposed between two adjacent groove areas. Also, for access based on a physical unit, a physical identifier (ID) area containing the address of each unit is formed as a pit series. In contrast, in the DVD-RW, data is recorded only in a groove area and no pits are formed. Instead, block addresses are formed in a land region as land pre-pits.

In addition, the DVD-RW has good recording/reproducing characteristics such as a superior jitter characteristic due to the depth and width of the groove. Advantageous jitter characteristics provide better jitter margins to allow superior flexibility with optical read/write devices that may produce a transport spin speed too high or too low for the media. The width and depth of the grooves in a DVD-RW are determined for excellent jitter characteristics without pits. An appropriate depth of the DVD-RW grooves is about 20-40 mm, which can be expressed as $\lambda/12n$, using the wavelength ($\lambda$) of a laser beam and the refractive index (n) of the disc. This groove depth of the DVD-RW is smaller than that of a DVD-RAM, which is expressed as $\lambda/6n$.

FIGS. 1A through 1D are graphs illustrating reproduction signals calculated according to the depth of the pit when a wavelength is 650 nm, an NA is 0.60, and a minimum mark length is 0.42 μm. In FIGS. 1A through 1D, a horizontal axis represents time in terms of ns, and a vertical axis shows normalized values of the reproduction signals. FIG. 1A illustrates a reproduction signal obtained when the depth of the pit is $\lambda/3$; FIG. 1B illustrates a reproduction signal obtained when the depth of the pit is $\lambda/4$; FIG. 1C illustrates a reproduction signal obtained when the depth of the pit is $\lambda/6$; and FIG. 1D illustrates a reproduction signal obtained when the depth of the pit is $\lambda/12$.

FIG. 2 shows the result when normalization is performed using the maximum value, that is, the signal from the depth of the DVD-RAM. Referring to FIG. 2, when the pits are formed below $\lambda/12$ (0.08$\lambda$), a reproduction signal of a 3T or 14T mark has a signal level corresponding to about 30% or less of the result given at the depth of $\lambda/4$ (0.25$\lambda$). Therefore, no reliable pit signals can be obtained from this signal. Consequently, the depth of the pit needs to be adjusted.

Since the pit and the groove in the DVD-RAM have a depth of approximately $\lambda/6$, a push-pull signal from the groove and the reproducing signal from the pit can be easily obtained. However, because the groove depth of a DVD-RW is much shallower, if the pits were the same depth as the groove, a push-pull signal from the pits would be difficult to obtain. As a result, a DVD-RW produced with grooves and pits having different depths would improve pit reproduction signal levels.

To address this problem, U.S. Pat. No. 5,501,926 discloses a technique of manufacturing two pits and grooves with different depths by the use of a special photoresist and an etching process. However, drawbacks to this technique may include complex manufacturing processes and high manufacturing costs.

U.S. Pat. No. 5,500,850 also discloses a process of manufacturing grooves with different depths. However a problem arises in that the paths of two laser beams have to be adjusted very precisely so as to form the grooves with different depths.

Likewise, an etching process can be utilized several times to define pits and grooves with different depths. That is, a dual-depth disk can be manufactured using an etching process. However, the manufacturing process is also complex and the production yield is low. As a result, production cost of the disk can be very high.

To overcome these drawbacks, a superior method of forming grooves and pits with different depths has been proposed by controlling a power of a laser beam as disclosed in Applicants' earlier work product, Korean Patent Publication Gazette No. 2001-0108961, and now issued as U.S. Pat. No. 6,906,994, the disclosure of which is incorporated by reference herein.

Nevertheless, there is still a need to rapidly finalize an optical disk manufactured as proposed.

SUMMARY OF THE INVENTION

Several aspects and example embodiments of the present invention provide a new technique to rapidly finalize an information recording medium during manufacture.

Additional aspects and/or advantages of the present invention will be set forth in part in the description which follows and, in part, will be obvious from the description, or may be learned by practice of the present invention.

In accordance with an embodiment of the present invention, an information recording medium is provided with a prepit pre-formed in a finalization area for finalizing the information recording medium. The finalization area may include a middle area of the information recording medium.

According to an aspect of the present invention, the recording medium may consist of a groove formed into one or more surfaces with a groove depth different than the depth of the prepit. The bottom face of the groove may be at the same level or may be at a different level than the bottom of the prepit. The recording medium may also be provided with information indicating whether the prepit is pre-formed in the finalization area. The information indicating the existence of a prepit pre-formed in the finalization area may be recorded in a predetermined area of the information recording medium. The recording medium may also be provided with a predetermined area to include a lead-in area or a control data area of the lead-in area.

In accordance with another embodiment of the present invention, there is provided an information recording medium having one or more layers, including: a data area in which user data is recorded; and a finalization area in which a prepit is pre-formed for a rapid finalization of the information recording medium, the finalization area including a middle area.

According to an aspect of the present invention, the information recording medium may further include a flexible middle area arranged according to data capacity to be recorded in the data area, the data being recorded in the flexible middle area as a mark. Information indicating whether the prepit is pre-formed in the middle area may be recorded in a predetermined area of the information recording medium.

In accordance with yet another embodiment of the present invention, there is provided a recording/reproducing apparatus to record data on an information recording medium and reproduce data recorded on the information recording medium. The recording/reproducing apparatus comprises: a write/read unit to write data on the information recording medium or read data from the information recording medium; and a control unit arranged to control the write/read unit to read information on the information recording medium indicating whether a prepit is pre-formed in a finalization area, the information being recorded in a predetermined area of the information recording medium; and utilize the read information during finalization of the information recording medium to determine whether to record data in the finalization area.

According an aspect of the present invention, the control unit may further control the write/read unit to read information indicating whether the prepit is pre-formed in the finalization area, the information being recorded in a control data area. When information indicating that the prepit is pre-formed in the finalization area, the control unit may control the write/read unit not to record data in the finalization area during the process of finalizing the information recording medium, and when the information indicating that the prepit series is not formed in the finalization area, the control unit may control the write/read unit to record data in the finalization area during the process of finalizing the information recording medium.

In accordance with another embodiment of the present invention, there is provided a recording/reproducing method for recording data on an information recording medium or reproducing data recorded on the information recording medium. Such a recording/reproducing method comprises: reading information indicating whether a prepit is pre-formed in a finalization area, the information being recorded in a predetermined area of the information recording medium; and determining whether to record data in the finalization area by using the read information during finalization of the information recording medium.

According to an aspect of the present invention, the recording/reproducing method may further include: when information indicating that the prepit is pre-formed in the finalization area, controlling a recording/reproducing apparatus not to record data in the finalization area during the process of finalizing the information recording medium, and when the information indicating that the prepit is not formed in the finalization area, controlling the recording/reproducing apparatus to record data in the finalization area during the process of finalizing the information recording medium.

In addition to the example embodiments and aspects as described above, further aspects and embodiments of the present invention will be apparent by reference to the drawings and by study of the following descriptions.

BRIEF DESCRIPTION OF THE DRAWINGS

A better understanding of the present invention will become apparent from the following detailed description of example embodiments and the claims, when read in connection with the accompanying drawings, all form a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EXAMPLE EMBODIMENTS

Figure 1A:
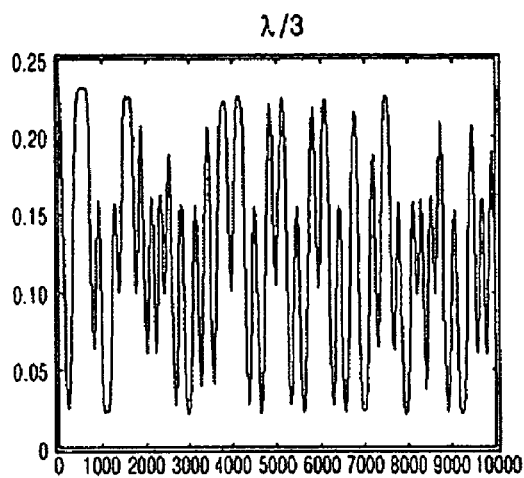
FIGS. 1A through 1D are graphs illustrating reproduction signals according to the depth of a pit when a wavelength ($\lambda$) is 650 nm, an NA is 0.60, and a minimum mark length is 0.42 µm.
Figure 1B:
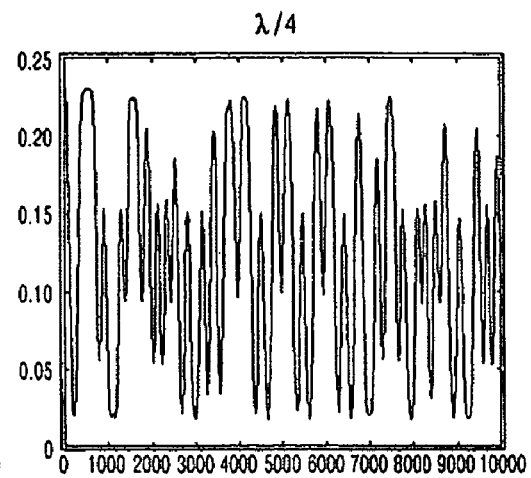
Figure 1C:
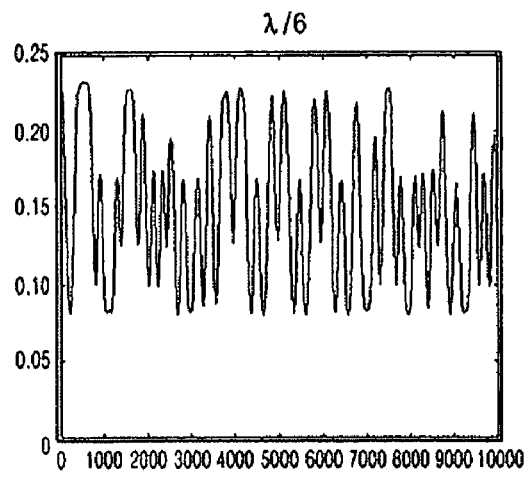
Figure 1D:
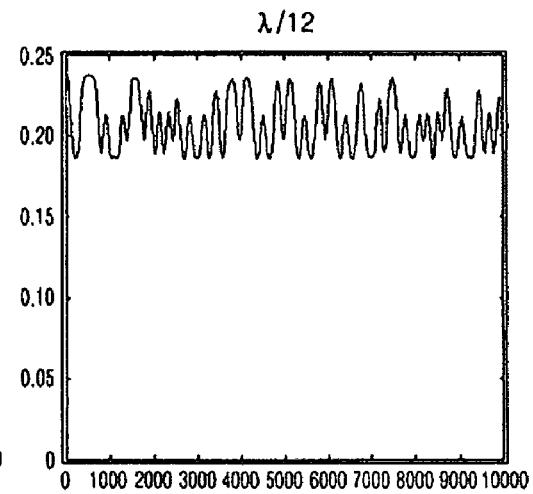
Figure 2:
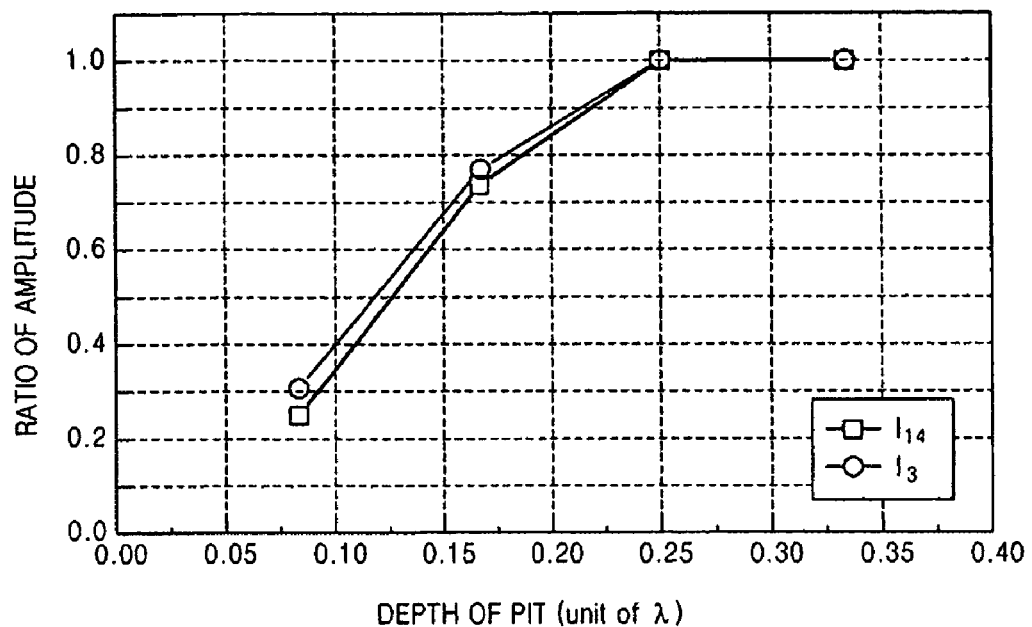
FIG. 2 is a graph of the normalized signal when the pit depth shown in FIG. 1C is $\lambda/4$.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
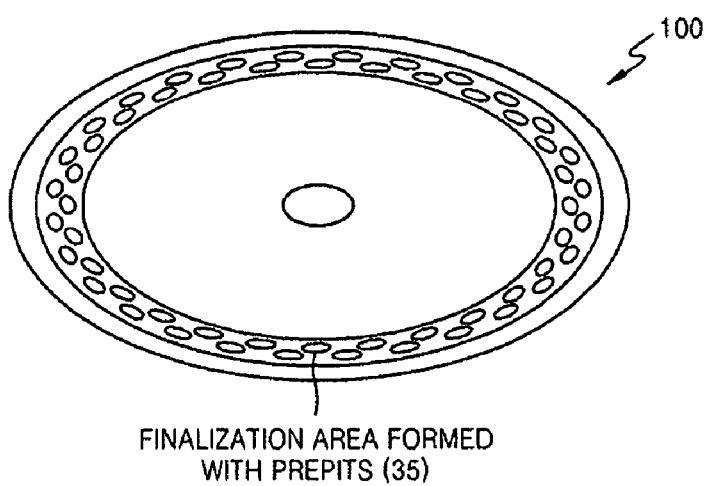
FIG. 3 is a schematic view of an information recording medium having a finalization area formed as a prepit series according to an embodiment of the present invention.

FIG. 3 is a schematic view of an information recording medium 100 having a finalization area 35 formed as a prepit series according to an embodiment of the present invention.

Finalization of an information recording medium represents a process performed to allow the use of the information recording medium only for data reproduction while limiting further attempts by a user to record further data thereon. The finalization process may include recording finalization completion information in a predetermined area of the information recording medium, writing a table of contents on the information storage medium and recording data in a predefined specific area thereof. According to known convention, data is required to be recorded in the specific area so as to finalize the information recording medium. However, according to the present invention, the specific area designated for the finalization of the information recording medium is formed in a prepit series when manufacturing the information recording medium. Thus, the present invention can reduce the time necessary to record data in the specific area during the finalization of the information recording medium. Consequently, the finalization of the information recording medium can be achieved more rapidly. It is also recognized that the time saving effect resulting from the manufactured prepit series can be much greater in the case of a multi-layered information recording medium where data can be stored on more than one layer of the data storage medium.

The specific area for the finalization of the information recording medium may be different depending on the specification of the information recording medium. For example, the specific area for finalization may include a middle area and may be a portion of a lead-in area or lead-out area, depending on the specification of the information recording medium. However, the specific location for the finalization may be another area of the information recording medium.

In forming the prepits in the finalization area, the depth of a groove formed in a data area may be different from the depth of the prepit formed in the finalization area to obtain a reliable prepit signal.

Figure 4:
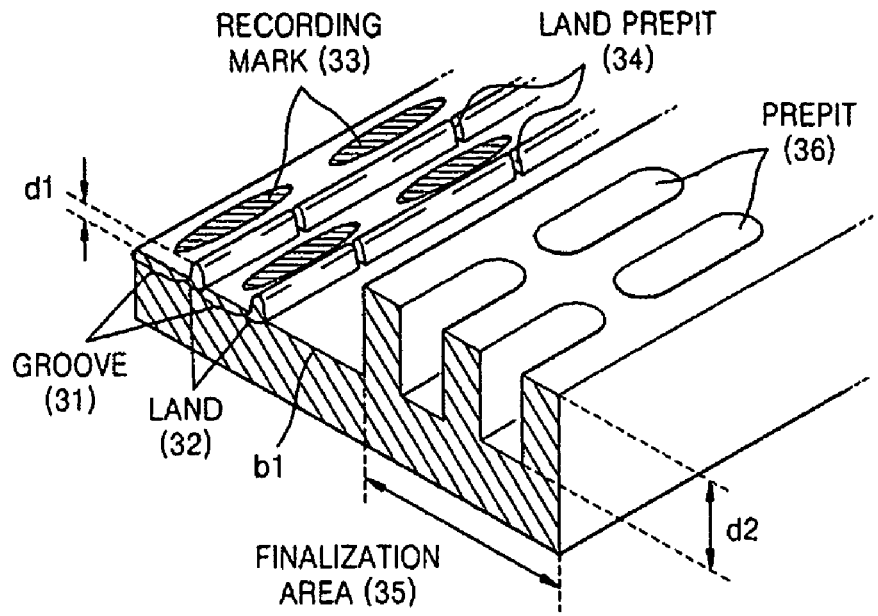
FIG. 4 is a perspective view of the information recording medium as shown in FIG. 3 when a bottom face of a groove is disposed at the same plane as that of a prepit formed in a finalization area, while a depth of the groove is different from that of the prepit.

Various methods can be used to manufacture the information recording medium as shown in FIG. 3. FIG. 4 is a perspective view of the information recording medium shown in FIG. 3 when a bottom face of a groove 31 is disposed at the same plane as that of a prepit 36 formed in a finalization area, while a depth of the groove 31 is different from that of the prepit 36.

Referring to FIG. 4, in the information recording medium 100 according to an embodiment of the present invention, tracks each having grooves 31 and lands 32 are formed in a data area or other areas. Prepits 36 are formed in the finalization area 35. Recording marks 33 formed in the grooves 31 according to data recording, and land prepits 34 are formed in the lands 32.

As shown in FIG. 4, the bottom face of the groove 31 and the bottom face of the prepit 36 formed in the finalization area 35 are at the same level b1. Also, the groove 31 has a depth d1, while the prepit 36 formed in the finalization area 35 has a depth d2. That is, the depth of the groove 31 is different from the depth of the prepit 36.

Figure 5:
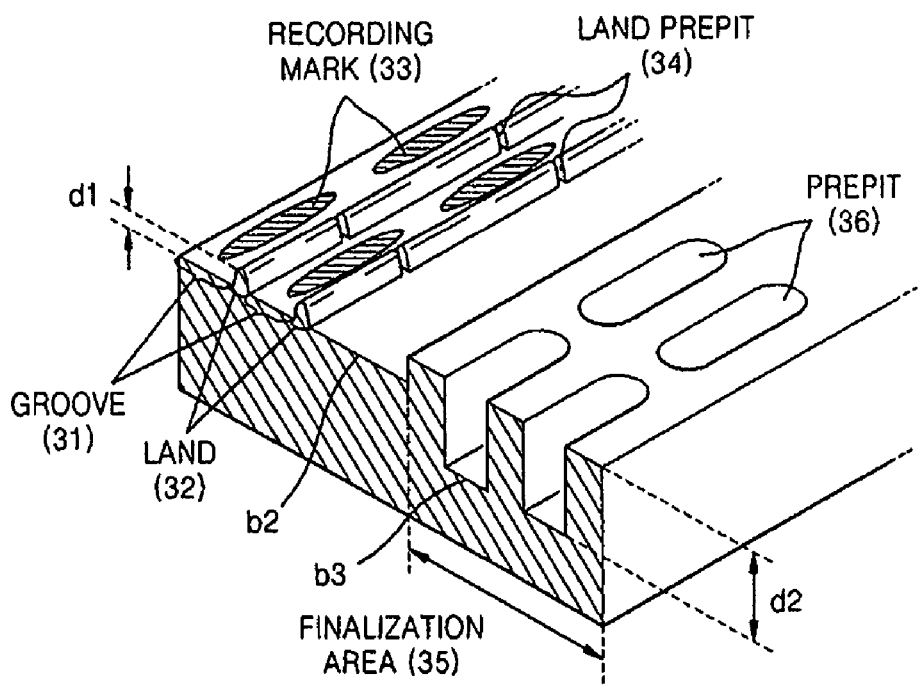
FIG. 5 is a perspective view of the information recording medium as shown in FIG. 3 when a bottom face of a groove is at a different level from that of a bottom surface of a prepit formed in a finalization area, and a depth of the groove is different from a depth of the prepit.

FIG. 5 is a perspective view of the information recording medium according to another embodiment of the present invention, when a bottom face of the groove 31 is at a different level from a bottom face of a prepit 36 formed in the finalization area 35, and a depth of the groove 31 is different from a depth of the prepit 36.

Referring to FIG. 5, in the information recording medium 100 according to an embodiment of the present invention, tracks each having grooves 31 and lands 32 are formed in a data area or other areas. Prepits 36 are formed in the finalization area 35. Recording marks 33 formed in the grooves 31 according to data recording, and land prepits 34 are formed in the lands 32.

As shown in FIG. 5, the bottom face of the groove 31 is at a level b2, while the bottom face of the prepit 36 formed in the finalization area 35 is at a level b3. That is, the bottom face of the groove 31 and the bottom face of the prepit 36 are at different levels. Also, the groove 31 has a depth d1, while the prepit 36 formed in the finalization area 35 has a depth d2. That is, the depth of the groove 31 is different from the depth of the prepit 36.

Figure 6:
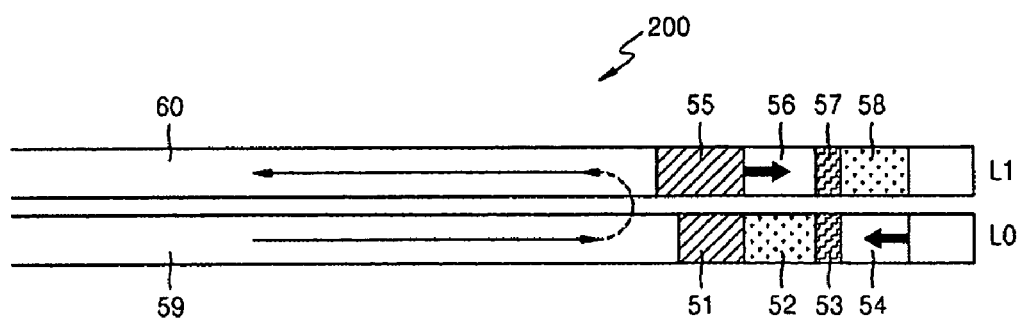
FIG. 6 is a view illustrating a dual-layer information recording medium in which prepits are formed in a middle area for finalizing the medium according to an embodiment of the present invention.

FIG. 6 is a view illustrating an example dual layer information recording medium 200 in which prepits are formed in a middle area for finalizing the medium according to an embodiment of the present invention. Referring to FIG. 6, the information recording medium 200 has a dual-layer structure with a layer #0 (L0) and a layer #1 (L1). The layer #0 includes a data area 59, a first fixed middle area 51, a first unused area 52, a first buffer area 53, and a first dedicated area 54. Similarly, the layer #1 includes a data area 60, a second fixed middle area 55, a second dedicated area 56, a second buffer area 57, and a second unused area 58.

In this example embodiment, the prepits are formed in the first fixed middle area 51 and the second fixed middle area 55 when manufacturing the information recording medium 200.

Data is recorded from the data area 59 of the layer 0 to the data area 60 of the layer 1. Data is recorded in the first dedicated area 54 and the second dedicated area 56 for predetermined purposes. For example, the first dedicated area 54 and the second dedicated area 56 may be used as a test area or an optimum power control area. The first unused area 52 and the second unused area 58 are not used so that the first dedicated area 54 and the second dedicated area 56 can use the areas if necessary. The first buffer area 53 and the second buffer area 57 are for the effective use of the first dedicated area 54 and the second dedicated area 56.

Figure 7:
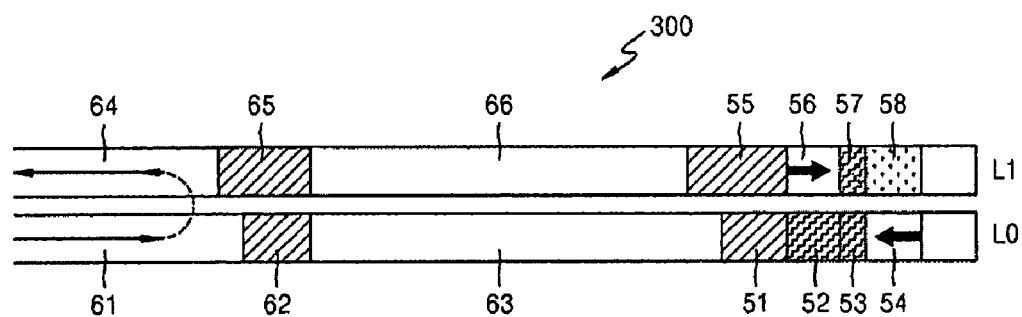
FIG. 7 is a view illustrating a dual-layer information recording medium in which prepits are formed in a middle area for finalizing the medium and the information recording medium is comprised of a first flexible middle area according to another embodiment of the present invention.

FIG. 7 is a view illustrating an example dual-layer information recording medium 300 in which prepits are formed in a middle area for finalization of the medium according to another embodiment of the present invention. Referring to FIG. 7, the information recording medium 300 has a dual-layer structure with a layer #0 (L0) and a layer #1 (L1). The layer #0 includes a data area 61, a first flexible middle area 62, an unrecorded area 63, a first fixed middle area 51, a first unused area 52, a first buffer area 53, and a first dedicated area 54. Similarly, the layer #1 includes a data area 64, a second flexible middle area 65, an unrecorded area 66, a second fixed middle area 55, a second dedicated area 56, a second buffer area 57, and a second unused area 58.

In this example embodiment, the prepits are formed in the first fixed middle area 51 and the second fixed middle area 55 when manufacturing the information recording medium 300. Since the first flexible middle area 62 and the second flexible middle area 65 are variably positioned according to the size of data to be recorded in the data area, they cannot be formed in a prepit series when manufacturing the information recording medium 300. For example, data is recorded in the groove as a recording mark. On the contrary, the fixed middle areas can be formed as a prepit series. Therefore, it is possible to save time required to record data in the fixed middle areas when finalizing the information recording medium, thereby achieving the rapid finalization of the information recording medium.

Thus, when the dual-layer information recording medium 300 is being written with data, a drive system checks the size of data to be recorded thereon, and records data in the layer #0 and the layer #1 such that the data recorded in the layer #0 and the layer #1 are of equivalent data size. In order to notify that the recording of the data is completed, the flexible middle areas 62 and 65 are arranged on the information recording medium 300 after the portion where the recording of the data is finished, and the remaining areas on the information recording medium 300 remain empty (that is, unrecorded), as shown in FIG. 7. By variably arranging the middle areas 62 and 65 in this manner, the remaining empty data areas need not be filled with data. Consequently, the time necessary to finalize the information recording medium 300 can be reduced. Since the other areas 51 to 58 are identical to those of FIG. 6, a further description thereof will be omitted.

Although the middle areas 62 and 65 have been presented as an example of the finalization area, any other area on the information recording medium 300 that can reduce the time necessary to finalize the information recording medium 300 can also be formed in a prepit series. Therefore, it is apparent to those skilled in the art that the areas formed in a prepit series for the finalization of the information recording medium 300 are not limited to the middle areas 62 and 65.

Figure 8:
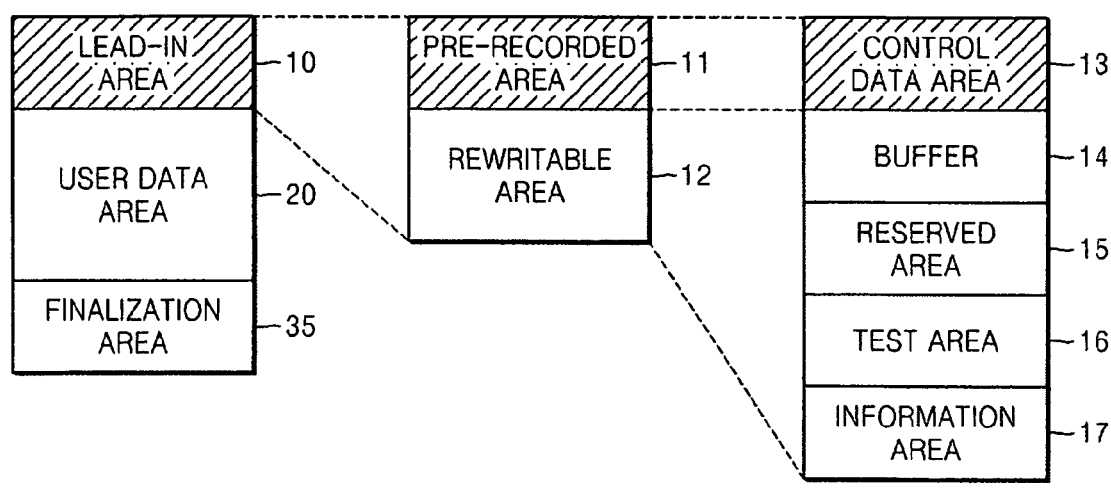
FIG. 8 is a block diagram view of an information recording medium according to an embodiment of the present invention, illustrating an area for recording information indicating that prepits are formed in a finalization area of the medium.

FIG. 8 is a view of an information recording medium according to an embodiment of the present invention to illustrate an area for recording information to indicate that prepits are formed in a finalization area of the medium.

Referring to FIG. 8, the information recording medium according to an embodiment of the present invention includes a lead-in area 10, a user data area 20, and the finalization area 35. The user data area 20 is an area for recording user data, and prepits are formed in advance in the finalization area 35. As described above, the finalization area 35 may be the middle area or any other area on the information recording medium.

The lead-in area 10 includes a pre-recorded area 11 and a rewritable area 12. The pre-recorded area 11 has a control data area 13 where information on the information recording medium is recorded in advance. Specifically, information about whether the prepits are formed in the finalization area may be recorded in the control data area 13. The information may be displayed in any form. An example is as follows:
  00b: Prepits are not formed in the finalization area
  01b: Prepits are formed in the finalization area It is apparent that the information about whether the prepits are formed in the finalization area can be recorded in other areas on the information recording medium instead of the control data area 13.

The rewritable area 12 includes a buffer 14, a reserved area 15 for later use, a test area 16 for testing the medium 100, and an information area 17 containing information related to a disk drive or a disk status.

Figure 9:
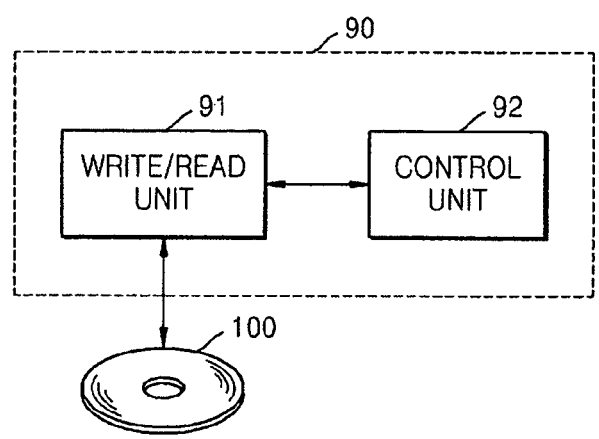
FIG. 9 is a schematic block diagram of a recording/reproducing apparatus using an information recording medium having an area for data indicating prepits are formed in a finalization area of the medium, according to an embodiment of the present invention.

FIG. 9 is a schematic block diagram of a recording/reproducing apparatus using an information recording medium having an area for recording information indicating the prepits are formed in a finalization area of the medium, according to an embodiment of the present invention. Referring to FIG. 9, the recording/reproducing apparatus 90 includes a write/read unit 91 and a control unit 92. For purposes of brevity, the recording/reproducing apparatus, albeit in whole or in part, can also be referred to as a drive system which can be internal (housed within a host) or external (housed in a separate box that connects to a host (not shown). In addition, the recording/reproducing apparatus as shown in FIG. 9 may be a single apparatus or may be separated into a recording apparatus (i.e., recorder) and a reading apparatus (i.e., player).

Under control of the control unit 92, the write/read unit 91 records data on the information recording medium 100 and reads the recorded data in order to reproduce the data. The control unit 92 controls the write/read unit 91 to read/write data from/on the information recording medium 100 according to commands issued from a host. Also, the control unit 92 processes the read data to obtain valid data. The host may be disposed in or outside of the recording/reproducing apparatus 90.

During finalization of the information recording medium 100, the control unit 92 controls the write/read unit 91 to read information indicating whether the prepits are formed in the finalization area, which is recorded in the control data area 13. When the write/read unit 91 provides the read information to the control unit 92 under control of the control unit 92, the control unit 92 determines whether the prepits are formed in the finalization area by using the provided information located on the information storage medium.

When the control unit 92 determines prepits are formed in the finalization area, the write/read unit 91 can be controlled to not record data in the finalization area during the process of finalizing the information recording medium 100.

Also, when the control unit 92 determines prepits are not formed in the finalization area, the write/read unit 91 is controlled to record data in the finalization area during the process of finalizing the information recording medium 100.

As described above, the portion that has to be filled with data in finalizing the information recording medium 100 is previously formed in a prepits series during manufacture of the information recording medium 100, and therefore the time necessary to finalize the information recording medium 100 can be shortened, thereby achieving the rapid finalization of the medium 100.

While the present invention has been particularly shown and described with reference to exemplary embodiments thereof, it will be understood by those of ordinary skill in the art that various changes in form and details may be made therein without departing from the spirit and scope of the present invention. Many modifications, permutations, additions and sub-combinations may be made to adapt the teachings of the present invention to a particular situation without departing from the scope thereof. For example, the information recording medium may consist of multiple layers to increase the potential data storage capabilities. In addition, the prepits pre-formed in the finalization area may be any depth necessary to ensure strong reproduction signals from the prepits and may be located in any place in the information storage medium. Accordingly, it is intended, therefore, that the present invention not be limited to the various example embodiments disclosed, but that the present invention includes all embodiments falling within the scope of the appended claims.

What is claimed is:
1. An information recording medium, comprising:
  a data area configured to store user data;

a first middle area whose location is fixed, and which is configured to be embossed by a manufacturer;

a second middle area which is variably positioned according to the amount of the user data to be recorded in the data area, and a predetermined area configured to store information indicating whether the first middle area is embossed, wherein when the information indicates that the first middle area is not embossed, data for finalization is recorded in the first middle area during finalization of the information storage medium, and wherein an outer circumference of the first middle area is adjacent to an unused area, an outer circumference of the unused area is adjacent to a buffer area, and an outer circumference of the buffer area is adjacent to a test area.

2. The information recording medium of claim 1, further comprising grooves formed in the information recording medium.

3. The information recording medium of claim 2, wherein:
the first middle area comprises prepits; and
a depth of each groove is different from a depth of each prepit.

4. The information recording medium of claim 3, wherein a bottom face of the groove is at the same level or a different level from a bottom face of the prepit.

5. The information recording medium of claim 1, wherein the predetermined area of the information recording medium comprises a lead-in area or a control data area of the lead-in area.

6. The information recording medium of claim 1, wherein data is recorded in the second middle area as marks.

7. A recording/reproducing apparatus for recording data on an information recording medium or reproducing data recorded on the information recording medium, the recording/reproducing apparatus comprising:

a write/read unit configured to record data on the information recording medium or to read data from the information recording medium comprising a data area configured to store user data; a first middle area whose location is fixed, and which is configured to be embossed by a manufacturer; a second middle area which is variably positioned according to the amount of the user data to be recorded in the data area, and a predetermined area configured to store information indicating whether the first middle area is embossed; and a control unit configured to:
control the write/read unit to read information indicating whether the first middle area is embossed, from the predetermined area in the information recording medium; and
control a data recording operation based on the information indicating whether the first middle area is embossed, wherein when the information indicates that the first middle area is not embossed, the control unit is configured to control the write/read unit to write data for finalization in the first middle area during finalization of the information recording medium, and wherein an outer circumference of the first middle area is adjacent to an unused area, an outer circumference of the unused area is adjacent to a buffer area, and an outer circumference of the buffer area is adjacent to a test area.

8. The recording/reproducing apparatus of claim 7, wherein the information is read from a control data area.

9. The recording/reproducing apparatus of claim 7, wherein:
when the information indicates that the first middle area is embossed, the control unit controls the write/read unit not to record data in the first middle area during the process of finalizing the information recording medium.

* * * * *